United States Patent [19]
Fujinami

[11] Patent Number: 5,701,590
[45] Date of Patent: Dec. 23, 1997

[54] RADIO COMMUNICATION SYSTEM FOR PERFORMING MULTI-CHANNEL ACCESS

[75] Inventor: Satoshi Fujinami, Tokyo, Japan

[73] Assignee: NEC Corporation, Tokyo, Japan

[21] Appl. No.: 500,134

[22] Filed: Jul. 10, 1995

[30]  Foreign Application Priority Data

Jul. 8, 1994 [JP] Japan ................... 6-157280

[51] Int. Cl.⁶ .................. H04B 1/10; H04B 15/00; H04B 17/00
[52] U.S. Cl. ............ 455/62; 455/56.1; 455/63; 455/303
[58] Field of Search ............... 455/53.1, 56.1, 455/62, 63, 65, 295, 303, 306

[56]  References Cited

U.S. PATENT DOCUMENTS

| | | | |
|---|---|---|---|
| 4,550,443 | 10/1985 | Freeburg | 455/62 |
| 4,977,608 | 12/1990 | Hashimoto et al. | 455/62 |
| 5,203,012 | 4/1993 | Patsiokas et al. | 455/62 |
| 5,390,366 | 2/1995 | Kasugai | 455/62 |
| 5,428,818 | 6/1995 | Meidan et al. | 455/63 |
| 5,548,809 | 8/1996 | Lemson | 455/62 |
| 5,551,064 | 8/1996 | Nobbe et al. | 455/62 |

FOREIGN PATENT DOCUMENTS

| | | |
|---|---|---|
| 56-39638 | 4/1981 | Japan. |
| 64-86635 | 3/1989 | Japan. |

*Primary Examiner*—Chi H. Pham
*Assistant Examiner*—Sam Bhattacharya
*Attorney, Agent, or Firm*—Sughrue,Mion,Zinn,Macpeak & Seas, PLLC

[57]  ABSTRACT

A radio communication system includes a plurality of mobile stations and a base station for selecting a plurality of radio channels whose frequencies are different from each other to perform radio communication with the mobile stations. The base station includes a plurality of pairs of receivers and transmitters, arranged in correspondence with the radio channels, for performing radio communication with the mobile stations, a plurality of reception field detectors for detecting that field levels of received signals output from the receivers are higher than a predetermined level, a controller for issuing an instruction to switch a radio channel when detection outputs which are larger in number than channels used in the base station are simultaneously generated by the reception field detectors, and a channel switching controller for selecting one pair from the pairs of idle receivers and idle transmitters on the basis of the instruction from the controller to switch at least one of busy radio channels, thereby continuing communication.

12 Claims, 2 Drawing Sheets

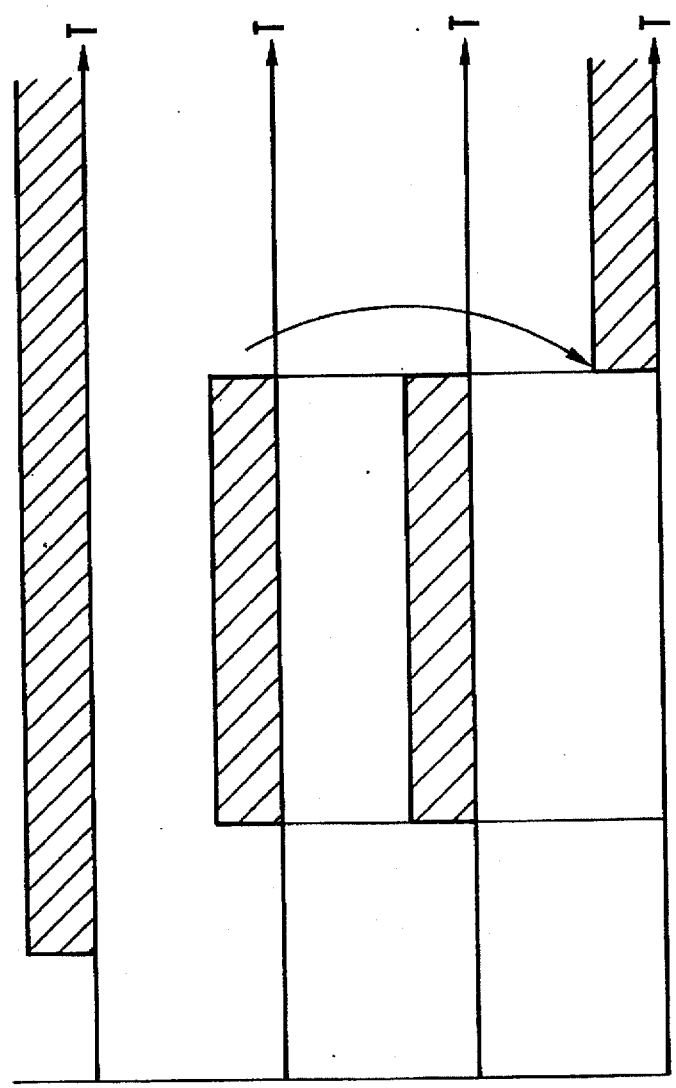
FIG. 2A  RADIO CHANNEL A
FIG. 2B  RADIO CHANNEL B
FIG. 2C  RADIO CHANNEL C (IM WAVE)
FIG. 2D  RADIO CHANNEL D

1

RADIO COMMUNICATION SYSTEM FOR PERFORMING MULTI-CHANNEL ACCESS

BACKGROUND OF THE INVENTION

The present invention relates to a multi-channel access radio communication system in which a plurality of radio channels are selectively used.

According to a multi-channel access scheme, each of base and terminal stations has a plurality of communication channels, and an idle communication channel is selectively used when a new communication channel is to be set. At this time, in one method of determining whether a communication channel is idle, the criterion is whether the level of the reception field in the communication channel is equal to or lower than a predetermined level. A communication channel having a reception field whose level is equal to or lower than the predetermined level is determined as an idle communication channel, and a communication channel having a reception field whose level is higher than the predetermined level is determined as a busy communication channel, and is excluded from being used in setting a new communication channel.

In recent years, a portable transceiver using the multi-channel access scheme has been popular. The portable transceiver is convenient because the portable transceiver can perform communication while being moved.

However, in a radio communication system using a multi-channel access scheme, a plurality of transmission frequencies close to each other are used. For this reason, when portable transceivers are used in close proximity to each other, and, are simultaneously set in a transmission state, transmission-intermodulated waves such as 3rd-, 5th-, and 7th-order transmission-intermodulated waves are generated by the transmitters of the portable transceivers. For example, when radio waves respectively having a frequency F+ΔF and a frequency F are simultaneously transmitted, a frequency F−ΔF is generated by intermodulation. When the frequency generated by the transmission intermodulation overlaps one of the reception frequencies of the base station, i.e., when the frequency is to be received by the base station, reception interference occurs. When the frequency generated by the intermodulation is the frequency of an idle channel, although the channel is not used, the channel is blocked. Therefore, use efficiency of frequencies is degraded because idle channels are incorrectly excluded from being used.

SUMMARY OF THE INVENTION

It is an object of the present invention to provide a radio communication system in which degradation of use efficiency of frequencies is prevented when a communication channel is selected using a multi-channel access scheme.

In order to achieve the above object, according to the present invention, there is provided a radio communication system comprising a plurality of mobile stations and a base station for selecting a plurality of radio channels whose frequencies are different from each other to perform radio communication with the mobile stations, wherein the base station comprises a plurality of pairs of receivers and transmitters, arranged in correspondence with the radio channels, for performing radio communication with the mobile stations, a plurality of reception field detection means for detecting that field levels of received signals output from the receivers are higher than a predetermined level, control means for issuing an instruction to switch a radio channel when the number of detection outputs simultaneously generated by the reception field detection means is larger than the number of channels being used in the base station, and channel switching means for selecting one pair from the multiple pairs of idle receivers and idle transmitters on the basis of the instruction from the control means to switch at least one of the busy radio channels, thereby continuing communication.

BRIEF DESCRIPTION OF THE DRAWINGS

FIGS. 2A to 2D are timing charts of communication channels of the radio communication system shown in FIG. 1.

DESCRIPTION OF THE PREFERRED EMBODIMENT

Figure 1:
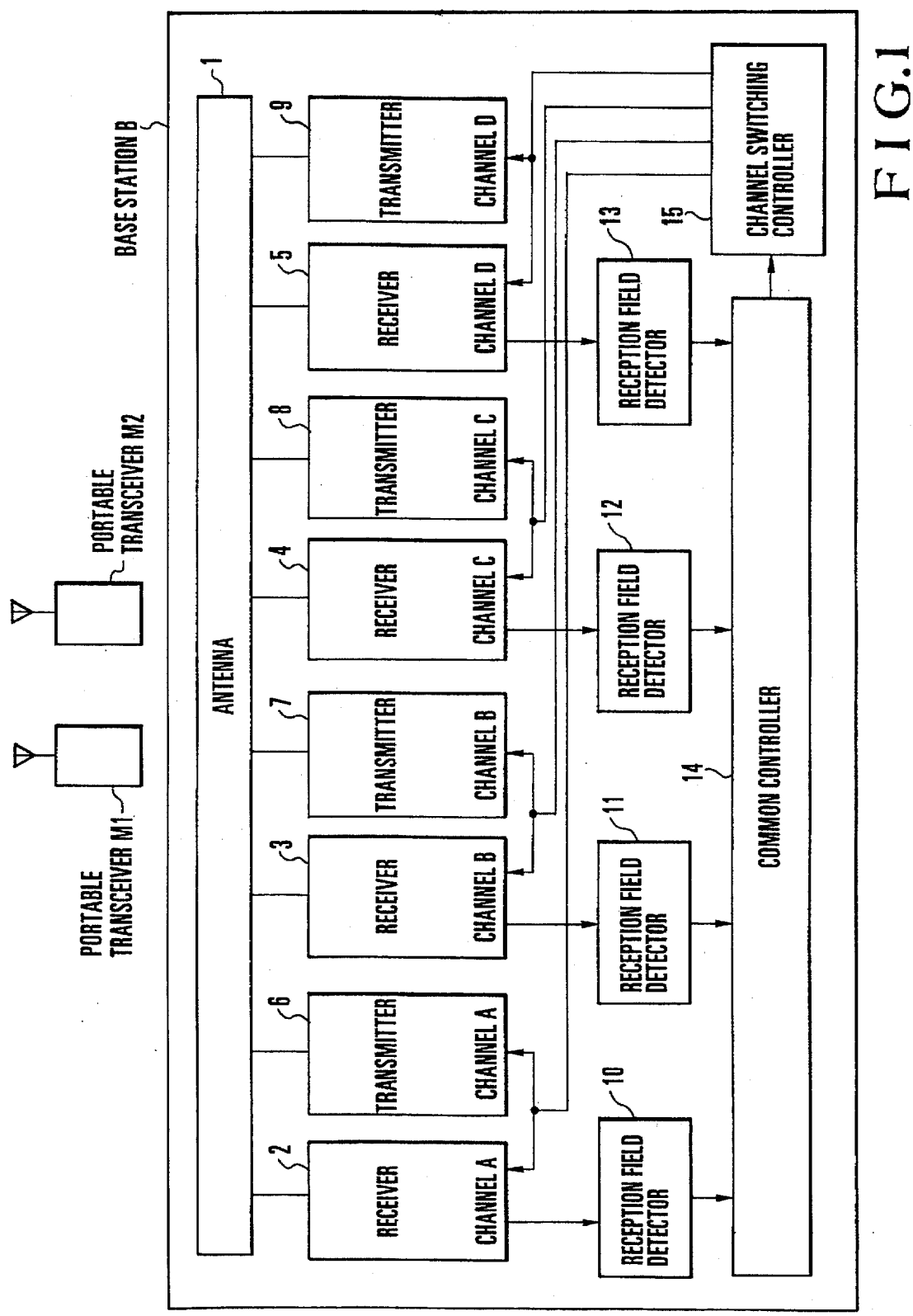
FIG. 1 is a block diagram showing a radio communication system according to an embodiment of the present invention.

FIG. 1 shows an embodiment of a radio communication system to which the present invention is applied. This radio communication system comprises a plurality of portable transceivers M1 and M2 serving as mobile stations, and a base station B for performing radio communication with the portable transceivers M1 and M2. In the base station B, reference numeral 1 denotes a common antenna 1 for exchanging radio signals with the portable transceivers M1 and M2; 2 to 5 denote a plurality of receivers, corresponding to channels A to D, for receiving radio signals from the portable transceivers M1 and M2 through the common antenna 1; 6 to 9 denote a plurality of transmitters, corresponding to the channels A to D, for transmitting radio signals to the portable transceivers M1 and M2 through the common antenna 1; 10 to 13 denote a plurality of reception field detectors for detecting that the reception field levels, of the radio channels A to D, output from the receivers 2 to 5 exceed a predetermined value; 14 denote a common controller for issuing an instruction to change the use frequencies (channels) of the portable transceivers M1 and M2 in accordance with detection outputs from the reception field detectors 10 to 13; and 15 denote a channel switching controller for selecting the receivers 2 to 5 and the transmitters 6 to 9 corresponding to the target channel in accordance with the instruction from the common controller 14.

In the system arranged as described above, the receivers 2 to 5 in the base station B respectively receive the frequencies of the radio channels A to D through the common antenna 1, and output the received signals to the reception field detectors 10 to 13. The reception field detectors 10 to 13 detect when the field levels of the received signals input to the reception field detectors 10 to 13 exceed the predetermined value, and output reception field detection information to the common controller 14. The common controller 14 monitors the reception field detection information from the reception field detectors 10 to 13. When a plurality of pieces of reception field detection information are generated at the same time, i.e., when electric fields which are larger in number than channels in use are detected at once, the common controller 14 instructs the channel switching controller 15 to change one of the frequencies used in the busy portable transceivers M1 and M2, thereby performing switching control for the receivers 2 to 5 and the transmitters 6 to 9. More specifically, the common controller 14 selects a radio channel to be used such that a frequency generated by transmission intermodulation is prevented from coinciding with the reception frequency of the base station.

FIGS. 2A to 2D explain the above control operation in more detail. Referring to FIGS. 2A to 2D, hatched portions indicate states wherein electric fields whose levels are higher than the predetermined value are detected in the receivers 2 to 5. For example, as shown in FIG. 2A, when the base station B is in speech communication with the portable transceiver M1 by the receiver 2 and the transmitter 6 using the radio channel A (frequency F1), the portable transceiver M2 starts communication by the receiver 3 and the transmitter 7 using the radio channel B (frequency F2), as shown in FIG. 2B. In this case, as shown in FIG. 2C, a frequency F3 of the radio channel C is generated by transmission intermodulation. This frequency F3 is generated by (2×F1) −F2. The frequency F3 generated by the transmission intermodulation is received by the receiver 4 through the common antenna 1, and field detection information is output from the reception field detector 12. In this situation, since two pieces of reception field detection information corresponding to the radio channels A and B are output from the reception field detectors 10 and 11, respectively, and three pieces of field detection information corresponding to the radio channels A to C are larger in number than the channels in use, and this information is all input to the common controller 14, then the controller thereby detects that transmission intermodulation has occurred.

At this time, since the frequency component of the radio channel C is generated at a time corresponding with the start of transmission of the radio channel B, the common controller 14 determines that the radio channel C is generated by transmission intermodulation of the portable transceiver M2 caused by the radio channel B. On the basis of the determination result, the common controller 14 instructs the channel switching controller 15 to switch the communication channel of the portable transceiver M2 from the radio channel B to the radio channel D such that the frequency F3 generated by a transmission-intermodulated wave will no longer coincide with the reception frequency of the radio channel B. As shown in FIG. 2D, on the basis of the instruction from the common controller 14, the channel switching controller 15 selects the radio channel D and switches to the designated receiver 5 and the transmitter 9.

Note that disconnection of speech communication is prevented by using a known technique for switching a busy channel is used in a channel switching operation. The radio channel B in which communication started later is a better choice as a channel to be switched. However, when the radio channel B cannot be switched due to some reason, the radio channel A in which communication has been previously started may be switched. In addition, all the busy radio channels A and B may be switched to different radio channels, respectively.

With this channel switching operation, the state wherein radio waves are received by the three radio channels although only two radio channels are used is changed into the state wherein radio waves are received by only two radio channels. More specifically, only a radio channel used in communication with a portable transceiver receives a radio wave, and an idle radio channel does not receive an interference wave. The result is that frequencies are more efficiently used.

Although the example using four radio channels has been described in the above embodiment, the number of radio channels is not limited to four. In addition, the common controller 14 designates the radio channel D as a target channel to the channel switching controller 15. However, the common controller 14 may instruct the channel switching controller 15 to select any idle radio channel, so that the channel switching controller 15 selects one of the available idle radio channels.

As has been described above, according to the present invention, when radio channels which are larger in number than the busy channels are set in a reception state at the same moment in the base station, it is determined that transmission intermodulation has occurred in a mobile station, and a selected busy channel is changed so that a frequency generated by the transmission intermodulation is different from the reception frequency of an idle channel of the base station. For this reason, idle channels of the base station are not blocked by the transmission intermodulation of the mobile station, and degradation of use efficiency of frequencies can be prevented.

What is claimed is:

1. A radio communication system comprising a plurality of mobile stations and a base station for selecting a plurality of radio channels whose frequencies are different from each other to perform radio communication with said mobile stations, wherein said base station comprises:
a plurality of pairs of receivers and transmitters, arranged in correspondence with said radio channels, for performing radio communication with said mobile stations;
a plurality of reception field detection means for detecting that field levels of received signals output from said receivers are higher than a predetermined level;
control means for issuing an instruction to switch a busy radio channel when detection outputs which are larger in number than channels used in the base station are simultaneously generated by said reception field detection means; and
channel switching means for selecting one pair from said pairs of idle receivers and idle transmitters on the basis of the instruction from said control means to switch at least one of said busy radio channels, thereby continuing communication.

2. A system according to claim 1, wherein when detection outputs which are larger in number than the busy channels are simultaneously generated by said reception field detection means with a start of communication between said base station, which is in communication with one of said mobile stations, and another mobile station, said common control means detects transmission intermodulation caused by said another mobile station.

3. A system according to claim 2, wherein said common control means issues an instruction to change one radio channel of said mobile station in which communication has been started last by detecting transmission intermodulation to control the number of detection outputs from said reception field detection means to be equal to the number of channels.

4. A system according to claim 2, wherein said common control means issues an instruction to change the radio channels of all said busy mobile stations by detecting transmission intermodulation to control the number of detection outputs from said reception field detection means to be equal to the number of channels in use.

5. A system according to claim 1, wherein said control means designates a radio channel to be switched and a target radio channel and issues an instruction, and said channel switching means switches said receivers and said transmitters in accordance with the instruction from said control means.

6. A system according to claim 1, further comprising a common antenna, to which said receivers and said transmitters are commonly connected, for transmitting/receiving radio signals between said base station and said mobile stations.

7. A radio communication system for selecting alternate radio channels used for communication between mobile and base stations according to detection of intermodulation frequencies comprising:

a plurality of mobile radio stations and a base station, each sharing a plurality of predetermined radio frequencies paired into radio channels having corresponding transmitters and receivers, and using one radio channel for each mobile station;

a reception field detector, for each receiver frequency at the base station, which generates a detection signal when a received field level is greater than a predetermined level;

control means which detect when the number of detection signals becomes greater than the number of radio channels in use by the base station, and which generate a switching instruction based upon the detection signals and which channels are in use; and channel switching means for selecting a different radio channel for a busy channel to use according to the switching instruction from said control means.

8. A system according to claim 7, wherein said control means detect which detection signals on an unused channel begin at the same time as the detection signal on a newly selected channel.

9. A system according to claim 8, wherein said control means generate an instruction to switch said newly selected channel to one of a plurality of idle channels upon detection of said detection signals of an unused channel.

10. A system according to claim 7, wherein said control means generate instructions to switch channels such that the number of said detection signals is substantially equal to the number of channels used.

11. A system according to claim 7, wherein said control means designate which channel is to be changed, and a target radio channel, and issue an instruction to said channel switching means which switch said transmitters and receivers in accordance with said instruction.

12. A system according to claim 7, further comprising a common antenna to which said transmitters and receivers are commonly connected at said base station.

* * * * *